United States Patent [19]

Ohkubo

[11] Patent Number: 5,085,941
[45] Date of Patent: Feb. 4, 1992

[54] MAGNETIC RECORDING MEDIUM WITH HYDROXY FUNCTIONAL, SULFONATED BINDER SYSTEM

[75] Inventor: Takatoshi Ohkubo, Atsugi, Japan

[73] Assignee: Minnesota Mining and Manufacturing Company, St. Paul, Minn.

[21] Appl. No.: 704,443

[22] Filed: May 23, 1991

Related U.S. Application Data

[60] Division of Ser. No. 437,646, Nov. 16, 1989, which is a continuation-in-part of Ser. No. 315,304, Mar. 1, 1989, abandoned.

[51] Int. Cl.$^5$ .............................................. G11B 23/00
[52] U.S. Cl. ............................. 428/424.6; 428/425.9; 428/694; 428/900; 252/62.54; 528/71
[58] Field of Search ............... 428/694, 900, 425.9, 428/424.6; 252/62.54; 528/71

[56] References Cited

U.S. PATENT DOCUMENTS

| | | | |
|---|---|---|---|
| 4,034,271 | 7/1991 | Miyoshi et al. | 428/323 |
| 4,707,411 | 11/1987 | Nakayama et al. | 428/413 |
| 4,743,501 | 5/1988 | Eguchi et al. | 428/328 |
| 4,784,907 | 11/1988 | Matsufuji et al. | 428/328 |
| 4,784,914 | 11/1988 | Matsufuji et al. | 428/418 |
| 4,786,557 | 11/1988 | Kakuishi et al. | 428/418 |
| 4,798,755 | 1/1989 | Yamada et al. | 428/141 |
| 4,806,417 | 2/1989 | Saito et al. | 428/323 |
| 5,023,135 | 6/1991 | Hasumi et al. | 428/336 |

FOREIGN PATENT DOCUMENTS 014337 6/1985 European Pat. Off. .
62-185225 8/1987 Japan .

*Primary Examiner*—
*Assistant Examiner*—Stevan A. Resan
*Attorney, Agent, or Firm*—Gary L. Griswold; Walter N. Kirn; David B. Kagan

[57] ABSTRACT

The present invention concerns magnetic recording media comprising fine, magnetizable pigment or particles dispersed in a binder and supported on a substrate. The invention particularly concerns the nature of the binder. The binder comprises a sulfonated, hydroxy-functional polyurethane polymer having sulfonate and cross-linkable hydroxyl groups pendant from the polyurethane polymer backbone. The hydroxyl groups are pendant from the polyurethane polymer at locally hydrophobic sites. The binder also comprises a sulfonated, hydroxy-functional vinyl chloride copolymer having sulfonate and cross-linkable hydroxyl groups pendant from the vinyl chloride copolymer backbone.

15 Claims, No Drawings

MAGNETIC RECORDING MEDIUM WITH HYDROXY FUNCTIONAL, SULFONATED BINDER SYSTEM

This is a division of application Ser. No. 07/437,646 filed Nov. 16, 1989, which is a continuation-in-part of application Ser. No. 07/315,304 filed March 1, 1988, now abandoned.

FIELD OF THE INVENTION

The present invention concerns magnetic recording media comprising fine, magnetizable pigment dispersed within a binder and supported on a substrate. The invention particularly concerns the nature of the binder and its preparation.

BACKGROUND OF THE INVENTION

Magnetic recording media generally include a binder dispersion layer overlying a substrate. The binder dispersion layer may comprise a binder composition and a pigment, wherein the pigment is dispersed within the binder composition. Typically, the pigment is a magnetizable pigment comprising small, magnetizable particles. In some instances, the medium may be in the form of a composite having both back-coat and front-coat binder dispersion layers, although the pigment in the back-coat may or may not be a magnetizable pigment.

It has become desirable to have as high a loading of magnetizable pigment in the magnetic recording media as is reasonably possible. It is often preferred to have a binder dispersion comprising from about 70% to 80% by weight magnetizable pigment relative to the binder with as many magnetizable particles per unit area or unit volume as possible. It is also preferred to have a binder dispersion in which the magnetizable pigment comprises a plurality of small particles having a relatively high specific surface area. Higher pigment loading has the potential to provide high density magnetic recording media capable of storing more information.

Problems, however, remain in the art concerning magnetic recording media having a relatively high loading of magnetizable pigment. To begin with, magnetizable pigments tend to agglomerate, and they are difficult to properly and fully disperse within the binder. Wetting agents, or dispersants, are often employed to facilitate such dispersion. For higher pigment loading, i.e., the use of greater amounts by weight and number of magnetizable particles, greater amounts of such dispersants are required, which is not always desirable.

There are a number of reasons for using as little dispersant as possible. When used in large amounts, dispersants can reduce the durability of the resulting magnetic recording medium. Excess dispersant may also have a tendency to bloom from a cured binder dispersion over time, leading to contamination of a recording head or the like, or causing a change in the physical or chemical characteristics of the media. Larger amounts of dispersants may result in lower modulus of the magnetic coating. If the modulus is too low, and if a back-coat having a relatively rough surface is required, e.g., to obtain better handling performance of a tape at fast speeds, the rough back-coat may emboss the relatively smooth magnetic front-coat when the tape is wound upon itself. Such embossing will degrade the output of the tape due to spacing loss between the front-coat and a recording head. Costs, too, can be reduced by using less dispersant. Additionally, binder dispersions can be more readily and reproducibly prepared when less dispersant is used.

Another problem in the art is that the viscosity of a binder dispersion generally increases with higher loading of magnetizable pigment. If the dispersion is too viscous, it can be difficult to apply to the substrate, and good magnetic orientation of the pigment, i.e., a squareness ratio of 0.75 or more, can be hard to obtain. The squareness ratio (Br/Bm), which is the ratio of the remnant saturation induction, or residual magnetization (Br), to the saturation induction, or saturation magnetization (Bm), refers to the effectiveness of the orientation of the magnetic particles. For randomly-oriented particles, the squareness ratio is 0.5 and for ideally and perfectly oriented particles, the ratio is equal to 1.0. Values for the squareness ratio, of media exhibiting good performance, normally fall around 0.75 to 0.85, with higher values being significantly better. The difference between a 0.75 and a 0.85 squareness ratio typically represents about a 1 decibel improvement in electromagnetic characteristics, which is manifested by an approximate 10% improvement in electromagnetic properties such as signal output and/or signal-to-noise ratio. In general, an increase in the squareness ratio is reflected by an improvement in orientation characteristics and electromagnetic properties and an increase from 0.75 to 0.80 (i.e. an increase of 0.05) results in a significant advantage.

To help alleviate these problems with high pigment loading, binder compositions having internal dispersants have been developed. Such compositions comprise polymers with functional moieties pendant from the polymer backbone that help disperse the magnetizable pigment. As a result of using these compositions, less dispersant is needed for dispersion of magnetizable pigment in the binder. Unfortunately, the known compositions having internal dispersants have been ineffective, or inefficient, for obtaining magnetic recording media having a relatively high pigment loading and/or a relatively high magnetic orientation, i.e., squareness ratio.

One class of such compositions comprises sulfonated polyurethanes. See, for example, U.S. Pat. No. 4,152,485, incorporated herein by reference. Although the sulfonated polyurethanes exhibit low viscosity for providing good, initial magnetic orientation, they may not cure sufficiently to maintain such orientation over long periods and may have inferior durability. Generally, it is the curing of the binder that retains the magnetizable pigment in an oriented manner.

Another class of binder compositions having internal dispersants comprises hydroxy-functional, sulfonated polyurethanes. See, for example, Japanese Kokai 61-198417. The hydroxy-functional, sulfonated polyurethanes have excellent curing properties as a result of the cross-linking capability provided by the hydroxy functionality. Unfortunately, however, the known hydroxy-functional, sulfonated polyurethanes exhibit such high dispersion viscosity that good initial magnetic orientation is difficult, or impossible, to obtain.

It has also become desirable to increase the durability, running properties, and reliability of the magnetic recording media. To accomplish this, attempts have been made to add a hard material to the pigment-containing binder. One such hard material is a vinyl chloride copolymer containing internal dispersants, such as vinyl chloride copolymer having pendant carboxyl groups or pendant sulfonate groups. Such materials are disclosed, for example, in Japanese Kokai 61-026932 and U.S. Pat. No. 4,731,292. However, when binder compositions are prepared using such vinyl chloride copolymers together with conventional sulfonated polyurethanes, or sulfonated, hydroxy-functional polyurethanes, such binder compositions exhibit relatively high dispersion viscosity, and the resulting magnetic recording media would have a low squareness ratio. Thus, use of the vinyl chloride copolymers having pendant carboxyl groups or pendant sulfonate groups has not provided high quality magnetic recording media.

It has also become desirable to provide magnetic recording media having high "green strength", i.e., high glass transition temperature (Tg) and tough abrasion resistance in the uncured state, and high final coating modulus. High green strength and high final coating modulus are desirable and necessary where stiffer tapes are needed for better handling in the recording and playback machine, or for improved resistance to damage during manufacture or processing. For example, such properties are needed for magnetic recording tape in which a rough back-coat must be used for proper tape transport properties.

SUMMARY OF THE INVENTION

The present invention relates to a binder composition characterized by a low dispersion viscosity for use in magnetic recording media and the like that includes an internal dispersion moiety and cross-linking functionality. The present invention has the advantage of providing excellent dispersion of magnetic pigment, while, at the same time, providing magnetic recording media having relatively high magnetic orientation (i.e., a squareness ratio of at least 0.75), even under conditions of relatively high pigment loading. As another advantage associated with having a low dispersion viscosity, the binder compositions of the present invention are also easier to apply to a recording media substrate than the more viscous binder compositions known in the art. The present invention also has the advantage of providing magnetic recording media with high green strength, high final coating modulus, and improved durability.

One aspect of the invention concerns a curable binder composition comprising from about 10 to about 90 parts by weight of a sulfonated, hydroxy-functional polyurethane polymer. A plurality of $SO_3M$ groups are pendant from the polyurethane polymer 10 backbone. The polyurethane polymer has an $SO_3M$ equivalent weight of from about 2,000 to 100,000, and preferably from about 5,000 to 30,000. The cation M is selected from the group consisting of $H^+$, $Li^+$, $Na^+$, $K^+$, $NR_4^+$ where R can be $H^+$ or an alkyl group, and mixtures thereof.

A plurality of cross-linkable hydroxyl groups are pendant from the polyurethane polymer backbone. The polyurethane polymer has a hydroxyl equivalent weight of from about 500 to about 10,000, and preferably from about 1000 to 5000. A majority, and preferably at least about 90%, and most preferably all, of the hydroxyl groups are pendant from the polyurethane polymer backbone at locally hydrophobic sites.

The binder composition also comprises from about 10 to about 90 parts by weight of a sulfonated, hydroxy-functional vinyl chloride copolymer. A plurality of $SO_3M$ groups are pendant from the vinyl chloride copolymer backbone. The vinyl chloride copolymer has an $SO_3M$ equivalent weight of from about 2,000 to about 100,000, and preferably from about 5,000 to about 30,000. The cation M is selected from the group consisting of $H^+$, $Li^+$, $Na^+$, $K^+$, $NR_4^+$ where R can be $H^+$ or an alkyl group, and mixtures thereof.

A plurality of cross-linkable hydroxyl groups are pendant from the vinyl chloride copolymer backbone. The vinyl chloride copolymer has a hydroxyl equivalent weight of from about 500 to about 10,000.

In another aspect, the present invention concerns a dispersion for use in magnetic recording media. The dispersion comprises the binder composition described above. A magnetizable pigment is dispersed in the composition.

In another aspect, the present invention concerns a composite for magnetic recording. The composite includes a substrate having a front side and a back side. The above-described dispersion is coated on at least one side of the substrate. The dispersion is cured.

The term "equivalent weight", as used herein with respect to a functionality or moiety, refers to the mass of polymer per mole, or equivalent, of functionality.

The binder compositions according to the present invention can be used in magnetic recording media as a back-coat, a front-coat, or both. The binder can be used to disperse a pigment comprising either magnetic particles or non-magnetic particles. Optionally, the binder compositions can also be used without particles. The binder can be used to prepare magnetic media such as tapes, e.g., video tape, computer tape, and data cartridge tape, and diskettes, e.g., single-sided and double-sided diskettes.

Binder compositions according to the present invention do not require wetting agents for facilitating dispersion of the magnetic pigment. That is, excellent dispersion of 70% to 80%, or more, by weight of pigment in a binder can be obtained, even in the absence of added dispersing agents. It is noted, however, that adjuvants such as head-cleaning agents, wetting agents, and lubricants still may be optionally utilized in the present invention. The magnetic dispersions, when used along with organic polyisocyanate cross-linkers, have a long pot-life and provide excellent three-dimensional cross-linking after curing. As a result of such excellent dispersion and curing properties, the present invention provides high density magnetic recording media having a high squareness ratio, i.e., a squareness ratio of at least about 0.75 to 0.80, or more.

Binder compositions according to the present invention also provide magnetic recording media with high green strength and high final coating modulus As a result of these properties, magnetic recording media according to the present invention are characterized by improvements in durability, surface smoothness, electromagnetic properties, abrasion resistance, and running stability under conditions of high temperature and high humidity In those cases where a relatively rough back-coat must be used for proper tape transport properties of a tape having a smooth, magnetic front-coat, magnetic media according to the present invention are characterized by less embossing of the front-coat by the back-coat.

DETAILED DESCRIPTION OF THE INvENTION

The curable binder composition according to the present invention comprises from about 10 to about 90 parts by weight of a curable, sulfonated, hydroxy-functional polyurethane polymer. The polyurethane polymer suitable for use in the binder composition of the present invention is fully described in assignee s copending application, Ser. No. 29,720 filed Oct. 31, 1989, which is a continuation-in-part of assignee,s copending application, Ser. No. 07/295,046, filed Jan. 6, 1989, now abandoned.

The polyurethane polymer may be viewed as comprising a plurality of segments, each segment being a structural fragment resulting from the reaction of a polyol with a polyisocyanate. The individual segments can be viewed as being soluble (hydrophobic) or insoluble (hydrophilic) in character. The term "insoluble" as used herein is meant to refer to a polyurethane segment of such a character that if a moderate to high molecular weight polyurethane (for example about 50,000 weight average) were made exclusively of the segment, the polymer would not be soluble in organic solvents such as methyl ethyl ketone, cyclohexanone, toluene, or tetrahydrofuran. On the other hand, a "soluble" segment is one of such a character that if a moderate to high molecular weight polyurethane (for example 50,000 weight average) were made exclusively of the segment, the polymer would be soluble in the above-mentioned solvents Preferred polyurethane polymers according to the present invention have both soluble and insoluble segments.

Herein, soluble (hydrophobic) and insoluble (hydrophilic) segments are generally identified and distinguished by relative molecular weight, chain length, and/or relative amount of polar functionality or character. That is, one way for identifying or defining these segments involves a comparison of the ratios of the number of carbon atoms to polar groups in the segment precursor. The term "polar group" as used in this context is meant to refer to such highly polar groups as hydroxyl-, sulfonate-, amino-, urethane-, and urea-groups, but not ester, carbonate, or ether functionality. In general, a ratio of less than about 3:1 identifies a precursor to an insoluble segment; whereas, a ratio of greater than about 3:1 identifies a precursor to a soluble segment. For example, under this model neopentyl glycol (5 carbons/2 polar groups) is a precursor to an insoluble segment, and a polycaprolactone triol such as Union Carbide Tone TM 0305 (about 28 carbons/3 polar groups)is a precursor to a soluble segment. Generally, hydrophobic, i.e., soluble, polymer chain segments comprise a residue of a polyol. The polyol has a hydroxyl equivalent weight of at least about 60, and preferably from about 100 to about 500. The polyol also has an average molecular wei9ht of at least about 180, and preferably from about 200 to about 1000. Most preferably, the polyol is a triol.

A plurality of $SO_3M$ groups are pendant from the polyurethane polymer backbone. The polyurethane polymer has an $SO_3M$ equivalent weight of from about 2,000 to about 100,000. Most preferably, the polyurethane polymer has an $SO_3M$ equivalent weight of from about 5,000 to 30,000. The cation M designates a cation selected from the group consisting of $H^+$, the alkali metal cations, i.e., $Na^+$, $Li^+$, and $K^+$, and $NRhd 4^+$ wherein R can be hydrogen or an alkyl group. M is preferably selected from the group consisting of $H^+$, $Li^+$, $Na^+$, $K^+$, and mixtures thereof. Most preferably, M is selected from the group consisting of Li , $Na^+$, $K^+$, and mixtures thereof, since the corresponding acids, if present in the final polymer, may tend to produce an overall polymer that is subject to decomposition. The $SO_3M$ groups wherein M is selected from $Li^+$, $Na^+$, $K^+$, and mixtures thereof, on the other hand, have been found to be excellent dispersive moieties.

The $SO_3M$ groups may be pendant from aromatic or aliphatic organic moieties that are incorporated into the polyurethane backbone. If a $SO_3M$ group is pendant from an aliphatic moiety, then such a group shall be referred to as an aliphatic $SO_3M$ group. If an $SO_3M$ group is pendant from an aromatic moiety, than such a group shall be referred to as an aromatic $SO_3M$ group.

Preferably, the $SO_3M$ group is an aromatic $SO_3M$ group, wherein M is $Na^+$, since at least one example of this type of compound is readily available from commercial sources, it can be easily incorporated into the polyurethane backbone, and its properties are well known. This preferred aromatic sodium sulfonate compound is dimethyl sodium sulfoisophthalate (DMSSIP).

It is believed that the sulfonate groups can be in either hydrophobic or hydrophilic environments However, if the sulfonate groups are located in the hydrophilic environments, the monomers used to make the polyurethane resin, or the resin itself, may not be sufficiently soluble in certain organic solvents such as methyl ethyl ketone, cyclohexanone, toluene, or tetrahydrofuran.

A plurality of cross-linkable hydroxyl groups are pendant from the polyurethane polymer backbone. The polyurethane polymer has a hydroxyl equivalent weight of from about 500 to 10,000. Most preferably, the polyurethane polymer has a hydroxyl equivalent weight of from about 1,000 to 5,000. A majority, preferably 90% or more, and most preferably all, of the cross-linkable hydroxyl groups are pendant from the polyurethane polymer backbone at locally hydrophobic sites.

By the term "locally hydrophobic" it is meant that the cross-linkable hydroxyl groups are pendant from portions of the polymer that do not include, in the immediate vicinity of a hydroxyl group, any moieties that are substantially polar or hydrophilic. That is, the cross-linkable hydroxyl groups are pendant from soluble (hydrophobic) chain segments, wherein the ratio of the number of carbon atoms to polar groups is greater than about 3:1. Preferably, the hydroxyl groups are each positioned in polymer chain segments having lengths of at least about 5 atoms separating the hydroxyl group from the nearest polar group. Most preferably, the hydroxy functionality is substantially centrally positioned within such a fragment or segment. The term "cross-linkable" and variants thereof, when used to refer to moieties in a polymer, is meant to refer to moieties available for cross-linking in final cure. It is not meant or implied that all cross-linkable moieties are necessarily cross-linked during final cure.

Polyurethane polymers according to the present invention are uniquely characterized by the hydrophobic groups are presented relative to the environment of the sulfonate dispersing moiety. When such is the case, the resultant polyurethane generally exhibits relatively low dispersion viscosity when loaded with pigment. For example, a polyurethane polymer according to the present invention generally exhibits a dispersion viscosity of less than about 20,000 centipoise and preferably less than about 5,000 centipoise when loaded with a pigment, such as a magnetic pigment. As a result of this characteristic of low dispersion viscosity, the polyurethane polymer according to the present invention provides magnetic recording media having high squareness.

While the reason that the present invention is characterized by low dispersion viscosity is not presently known, and the inventors do not wish to be held to any particular theory, a rationale can be suggested. Practical tests have shown that any interaction between the hydroxyl groups and the oxide surfaces of the pigment appears to generally increase viscosity. Being in a hydrophobic environment, the cross-linkable hydroxyl groups are less likely to encounter pigment surface for adhesion thereto than they would be if in hydrophilic environments. As a result, interactions between the cross-linking moiety and the oxide surfaces of the pigment are minimized. Further, interference between the cross-linking moiety, i.e., the hydroxyl groups, and the dispersant moiety, i.e., the SO₃M groups, is also minimized. Thus, the advantages of the polyurethane polymer according to the present invention may result, at least in part, from reduction in the likelihood of interaction between the cross-linkable hydroxyl groups and oxide surfaces of the pi9ment. It is also believed that the interaction of the sulfonate groups with the oxide surfaces facilitates the dispersion of the magnetic pigment.

A curable, sulfonated, hydroxy-functional polyurethane polymer according to the present invention is prepared by reacting a polyol with a sulfonated polyisocyanate having at least two reactive isocyanate groups. The polyol is generally hydrophobic. Preferably the polyol has at least three reactive hydroxyl groups and has a hydroxyl equivalent weight of at least about 60. Such a polyol can be reacted with a sulfonated polyisocyanate at two reactive hydroxyl sites to prepare a polyurethane resin having at least one hydroxyl group available for later cross-linking during cure of the polymer. The polyol is present in a sufficient amount such that there is at least about a 67% excess of reactive hydroxyl groups relative to reactive isocyanate groups.

Typically, the polyol is a triol. Preferred triols are triols having a molecular weight greater than about 180. Most preferred are triols having a molecular weight of from about 200 to about 1,000. A preferred class of triols comprises polycaprolactone triols. One particularly useful triol is a polycaprolactone triol having a hydroxy equivalent weight of about 180 (molecular weight approximately 540). One such high molecular weight triol is available under the trade designation Tone TM 0305 from Union Carbide Company. Other useful triols include polypropylene oxide triol, and polyester triols other than polycaprolactone triols, e.g. butylene adipate triols.

Preferably the hydroxyl groups in the triol are primary, facilitating rapid reaction with the curing agent to form the polymer. The reaction of primary alcohols with a diisocyanate such as diphenylmethane diisocyanate is relatively rapid at temperatures of from about 45° C. to 70° C. In some instances catalysts, such as dibutyltin dilaurate or dimethyltin dilaurate, may be used to facilitate reaction. It is foreseen, however, that some secondary triols may be utilized in compositions according to the present invention. It is also foreseen that mixtures of various triols may be utilized.

The sulfonated polyisocyanate can be prepared by reacting a sulfonated diol with an excess of polyisocyanate. Preferably, there is at least a 30% excess of isocyanate functionality in the polyisocyanate relative to hydroxy functionality in the sulfonated diol.

The reaction is generally represented by the following scheme:

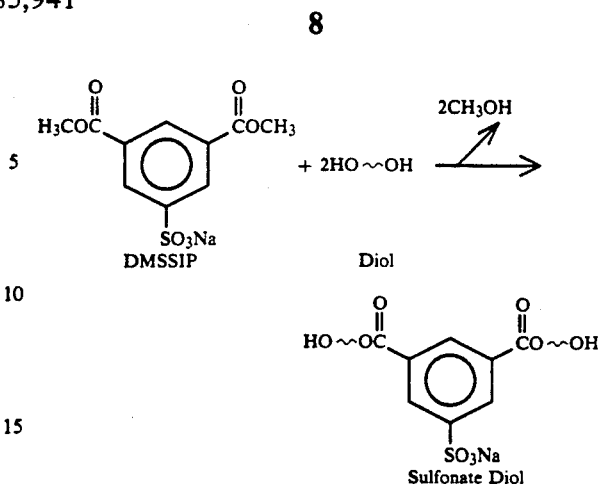

A wide variety of polyisocyanates may be utilized to form the polymers of the present invention. A particularly well-known and useful class of polyisocyanates are diisocyanates such as diphenylmethane diisocyanate. Other useful diisocyanates include: isophorone diisocyanate; toluene diisocyanate; hexamethylene diisocyanate; tetramethylene diisocyanate; and, p-phenylene diisocyanate. It is noted that mixtures of diisocyanates can also be used.

A preferred class of sulfonated diols or monomers can be prepared from the reaction of from about two to about four equivalents of an appropriate diol per equivalent of dimethyl sodium sulfoisophthalate (DMSSIP). The isophthalate includes two ester groups that can be readily esterified, by reaction with two equivalents of diol, to lead to an extended diol structure having an aromatic sulfonate group therein. In some instances, catalysts such as tetrabutyltitanate may be used to facilitate the reaction.

A variety of diols may be utilized. Also, mixtures of diols can be used. A preferred class of diols are the polycaprolactone diols having a hydroxyl equivalent weight of from about 200 to 2,000. One such material is Tone TM 0210, available from Union Carbide Company. Tone TM 0210 is a polycaprolactone diol having a hydroxyl equivalent weight of about 415. The result of reaction of about 4 equivalents of Tone TM 0210 per equivalent of DMSSIP is a sulfonated diol having a hydroxyl equivalent weight of about 603 and a centrally located aromatic sulfonate group.

Other diols which may be reacted with DMSSIP, in order to provide a sulfonated monomer for incorporation in polymers according to the present invention include: polyether diols such as polytetramethylene glycols and polypropylene glycols; polycarbonate diols such as Duracarb 120, a polycarbonate diol sold by PPG Industries, Inc., Pittsburgh, Pennsylvania 15272; and, polyester diols, such as a polyester diol that is the reaction product of adipic acid and butane diol. Additionally, sodium dimethyl-5-sulfoisophthalate may be utilized with: other diesters or diacids including dimethyl isophthalate, dimethyl terephthalate, and dimethyl adipate; and, diols to produce co-polyester diols containing sulfonate. Some examples of such diols are: ethylene glycol; propylene glycol; 1,3- propane diol; 1,4-butane diol; 1,5-pentane diol; 1,6-hexane diol; neopentyl glycol; diethylene glycol; dipropylene glycol; 2,2,4-trimethyl-1,3-pentane diol; 1,4-cyclohexanedimethanol; ethylene oxide and/or propylene oxide adduct of bisphenol A; ethylene oxide and/or propylene oxide adduct of hydrogenated bisphenol A; polyethylene glycol; polypropylene glycol; and, polytetramethylene glycol.

Optionally, it may be desirable to use other polyols to prepare the polyurethane polymer in order to give preferred characteristics to the polyurethane. For example, chain extension agents may be incorporated into the polyurethane backbone, to improve ductility or strength characteristics. Such polyols are typically diols, so that use of such optional polyols for making the polyurethane polymer provides relatively little, if any, unreacted hydroxy groups available for later cross-linking. Such polyols include neopentyl glycol, 1,4-butane diol, 1,6- hexane diol, cyclohexane dimethanol, ethylene glycol, and polyester polyols such as Tone TM 0210 and Tone TM 0230, otherwise referred to herein as non-sulfonated diols. Preferably, at least some low molecular weight (less than about 120) diols, i.e., non-sulfonate-containing diols, are used to provide preferred characteristics to the overall product. Also, higher molecular weight non-sulfonated diols, such as the polycaprolactone diols Tone TM 0210 or Tone TM 0230, may be used to provide preferred characteristics to the product. It is further noted that for any of the reactants mentioned, mixtures of materials can be utilized.

A preferred method of preparing polyurethane polymers according to the present invention comprises the reaction of three key components described above: the sulfonated diol; the polyisocyanate; and the triol. This preferred method shall be referred to herein as the "prepolymer synthetic method". This method is designed to ensure that substantially all of the unreacted hydroxyl groups in the polymer that are available for final cure are those hydroxyl groups that are pendant from the triol, i.e., the hydrophobic se9ment precursor. It is noted that if the diol is also a hydrophobic, i.e., soluble, material, it may not be necessary to ensure that all unreacted hydroxyl groups result from the triol.

In a first step, the sulfonated diol and any other optional polyols such as non-sulfonated diols, are reacted with an excess of the polyisocyanate to form a sulfonated polyisocyanate. There should be a sufficient excess of isocyanate functionality for substantially complete reaction of the diol hydroxyl groups. For example, there should be at least a 30% excess of reactive isocyanate functionality in the polyisocyanate relative to hydroxy functionality in the diol and optionally-added polyols. This provides a sulfonated polyisocyanate with relatively little, if any, reactive hydroxy functionality for later cross-linking.

In a second step, the sulfonated polyisocyanate product of the first step is reacted with an excess of the triol. Typically, the triol reactant has a relatively high molecular weight, i.e. a molecular weight of at least about 180, and preferably about 200 to 1,000. The triol should have little other polar functionality other than the hydroxyl groups, and the hydroxyl groups should be well spaced in the triol. Preferably, there is at least a 67% excess of hydroxy functionality in the triol relative to isocyanate functionality in the sulfonated polyisocyanate.

As one example of the preferred prepolymer synthetic method, a sulfonate diol monomer, neopentyl glycol, and diphenylmethane diisocyanate are combined in methyl ethyl ketone solvent in a ratio such that the number of isocyanate groups per hydroxyl group is initially about 1.3. After all available hydroxyl groups have been reacted, a prepolymer is obtained containing an excess of isocyanate. The prepolymer is subsequently reacted with a hydrophobic triol such that the ratio of isocyanate groups to hydroxyl groups is within the range of about 0.3 to about 0.6. The resultant polyurethane polymer product has cross-linkable hydroxyl groups pendant from hydrophobic polymer chain segments.

The curable binder composition of the present invention also comprises from about 10 parts to about 90 parts by weight of a curable, sulfonated, hydroxy-functional vinyl chloride copolymer. The vinyl chloride copolymer can be prepared by copolymerizing a vinyl chloride monomer, a sulfonated monomer having a pendant SO$_3$M group, and optionally, a monomer having a pendant epoxy group, and, if desired, other types of monomers amenable to copolymerization. As for such other types of monomers, those containing a vinyl group are preferable. The combination of these monomers for copolymerization can be varied to optimize the properties of the resultant vinyl chloride copolymer. Preferably, the curable vinyl chloride copolymer is used as the hard component of the inventive binder composition in combination with the curable polyurethane polymer which is used as the soft component of the binder.

The vinyl chloride copolymer can be prepared by various polymerization methods, such as emulsion polymerization, solution polymerization, suspension polymerization, and block polymerization. In any of such polymerization methods, incremental or continuous addition of a molecular weight control agent, a polymerization initiator, and the monomers for copolymerization may be used when necessary.

Preferably, the vinyl chloride monomer is present in a sufficient amount such that the vinyl chloride copolymer has a vinyl chloride monomer unit content of at least 60% by weight.

Examples of suitable, sulfonated monomers having pendant SO$_3$M groups that are amenable to copolymerization include

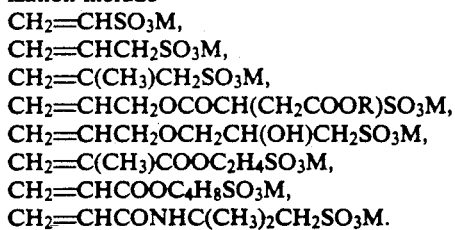

$CH_2=CHSO_3M$,
$CH_2=CHCH_2SO_3M$,
$CH_2=C(CH_3)CH_2SO_3M$,
$CH_2=CHCH_2OCOCH(CH_2COOR)SO_3M$,
$CH_2=CHCH_2OCH_2CH(OH)CH_2SO_3M$,
$CH_2=C(CH_3)COOC_2H_4SO_3M$,
$CH_2=CHCOOC_4H_8SO_3M$,
$CH_2=CHCONHC(CH_3)_2CH_2SO_3M$.

In the above, M is a cation selected from the group consisting of H$^+$, the alkali metal cations, i.e., Na$^+$, Li$^+$, and K$^+$, and NR$_4^+$ wherein R can be hydrogen or an alkyl group. M is preferably selected from the group consisting of H$^+$, Li$^+$, Na$^+$, K$^+$, and mixtures thereof. Most preferably, M is selected from the group consisting of Na$^+$, Li$^+$, K$^+$, and mixtures thereof since the corresponding acids, if present in the final copolymer, may tend to produce an overall copolymer that is subject to decomposition. The SO$_3$M groups wherein M is selected from Li$^+$, Na$^+$, K$^+$, and mixtures thereof, on the other hand, have been found to be excellent dispersive moieties. R represents an alkyl group, preferably having 1 to 20 carbon atoms.

Alternatively, sulfonate groups can also be incorporated into a vinyl chloride copolymer having pendant hydroxy groups by way of the following mechanisms:

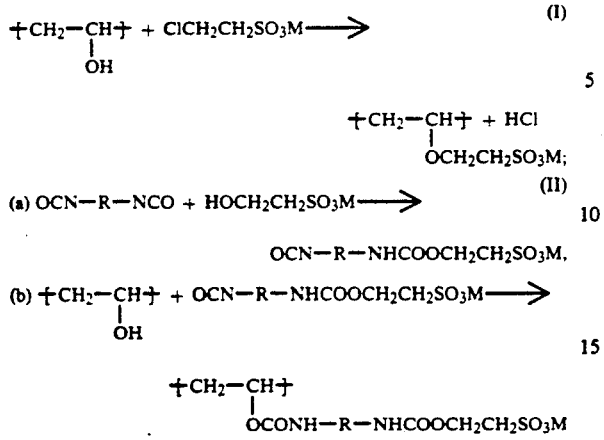

(I)

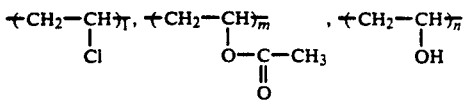

(II)

In the foregoing reactions, R represents a hydrocarbon group.

The sulfonated monomer should be present in an amount sufficient to provide a vinyl chloride copolymer comprising a plurality of pendant $SO_3M$ groups and having an $SO_3M$ equivalent weight of from about 2,000 to about 100,000. Most preferably, the vinyl chloride copolymer has an $SO_3M$ equivalent weight of from about 5,000 to 30,000.

With respect to both the polyurethane polymer and the vinyl chloride copolymer, if the $SO_3M$ equivalent weight is too low, then the dispersibility of magnetic powders will not be adequate. On the other hand, if the $SO_3M$ equivalent weight is too high, then the resultant polymes may too hydrophilic to be sufficiently soluble in organic solvents, the moisture resistance of a coated layer will be reduced, and the magnetic powders may agglomerate, resulting in reduced dispersibility.

In order to provide a vinyl chloride copolymer having a plurality of cross-linkable hydroxyl groups pendant from the vinyl chloride copolymer backbone, the vinyl chloride copolymer contains monomeric units having pendant hydroxyl groups. These monomer units should be present in a sufficient amount such that the vinyl chloride copolymer has a hydroxyl equivalent weight of from about 500 to 10,000. Examples of suitable monomers having pendant hydroxyl groups include, for example, an alkanol ester of a $\beta$-unsaturated acid, which has 2 to 4 carbon atoms, such as 2-hydroxyethyl methacrylate, 2-hydroxypropyl methacrylate or the like; an alkanol ester of an unsaturated dicarboxylic acid, such as 2-hydroxypropyl monomaleate, 2-hydroxypropyl dimaleate, 2-hydroxybutyl monoitaconate or the like; an olefin type alcohol such as 3-butene-1-ol, 5-hexene-1-ol or the like; an alkanol vinyl ether such as 2-hydroxyethyl vinyl ether, 2-hydroxypropyl vinyl ether or the like; an acrylamide such as N-methylolacrylamide, N-methylolmethacrylamide or the like.

Alternatively, a vinyl chloride copolymer comprising vinyl chloride monomer units and vinyl acetate monomer units can be partially hydrolyzed to provide a vinyl chloride copolymer comprising pendant, isocyanate reactive, i.e., cross-linkable, hydroxyl groups. Such a vinyl chloride copolymer would have monomer units such as the following:

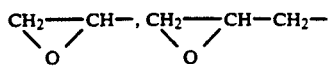

The cross-linkable hydroxy functionality generated by hydrolysis of some of the vinyl acetate groups can, thus, contribute to the bridge formation reactions with a curing agent.

The vinyl chloride copolymer preferably contains monomer units having pendant epoxy groups, such as:

$$CH_2\!-\!\!-\!\!-CH\!-,\ CH_2\!-\!\!-\!\!-CH\!-\!CH_2\!- \atop \diagdown\!O\!\diagup \qquad \diagdown\!O\!\diagup$$

The monomer units of a vinyl chloride copolymer comprising such epoxy monomer units, for example, would be as follows:

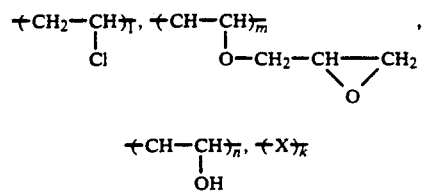

where X represents the monomeric unit portion containing $SO_3M$ groups.

Use of a monomer having a pendant epoxy group improves the heat stability, durability, anti-abrasion properties, and the like of the vinyl chloride copolymer. When present in a binder dispersion composition, the epoxy groups minimize the dechlorination of the magnetic layer. By varying the epoxy equivalent weight in the resultant vinyl chloride copolymer, the use of these epoxy monomers is also effective for adjusting the glass-transition temperature (Tg) and plasticizing effects of the binder composition.

Examples of suitable monomers having pendant epoxy groups include a glycidyl ether of an unsaturated alcohol, such as allylglycidyl ether or methallylglycidyl ether; a glycidyl ester of an unsaturated acid, such as glycidyl acrylate, glycidyl methacrylate, glycidyl-p-vinylbenzoate, methylglycidyl itaconate, glycidyl ethylmaleate, glycidyl vinyl-sulfonate, glycidyl(meth-a)allylsulfonate or the like; an epoxide olefin such as butadiene monoxide, vinylcyclohexene monoxide, 2-methyl-5, 6-epoxyhexene, or the like.

The above-mentioned monomers may be used in an amount such that the vinyl chloride copolymer has an epoxy equivalent weight of from about 500 to about 30,000, and preferably of from about 1,000 to 10,000. If the epoxy equivalent weight is greater than about 30,000, the heat-resistance of the copolymer will be lowered.

Other types of monomers amenable to copolymerization include various kinds of vinyl esters, such as vinyl acetate, vinylidene chloride acrylonitrile, methacrylonitrile, styrene, acrylic acid, methacrylic acid, acrylates, such as methyl acrylate, ethyl acrylate, isopropyl acrylate, n-butyl acrylate, 2-ethylhexyl acrylate, methacrylates such as methyl methacrylate, ethyl methacrylate, isopropylmethacrylate, n-butyl methacrylate, isobutyl methacrylate, n-hexyl methacrylate, and lauryl methacrylate, and other unsaturated monomers, such as vinyl ethers, aryl ethers, aryl esters, acrylamide, methacrylamide, maleic acid, maleate esters, mono-olefins, and di-olefins.

Dispersions according to the present invention generally comprise a binder composition and a pigment dispersed in the binder composition. The binder composition is a mixture of the above-described curable polyurethane polymer and curable vinyl chloride copolymer. The pigment may be magnetizable or nonmagnetizable. Dispersion of the pigment in the binder is facilitated by the incorporated sulfonate moiety. The resulting dispersion can be readily applied to a substrate, and cured through reaction of the remaining cross-linkable hydroxy groups.

The preparation of dispersions of magnetic powders with polyurethanes, as characterized by the present invention, is relatively straight-forward. As indicated, addition of wetting agents or dispersing agents can generally be avoided, even with relatively high load situations, i.e., about 70% to 80% by weight of magnetic pigment relative to binder, used in the preparation of high density media, represented by at least about 30,000 flux changes per inch. A variety of pigments may be used, including: ferric oxide; gamma ferric oxide; chromium oxide; iron; iron-cobalt; cobalt; nickel; cobalt-nickel; cobalt-phosphorus; and barium ferrite.

It is foreseen that a variety of loadings, densities, solvent systems, etc., may be utilized. The following conditions are typical. 100 parts of fine pigment (Co-$\gamma$-Fe2O3) having a surface area 50 $m^2/g$ and a powder coercivity of 780 Oersted, 30 parts of binder, and 214 parts of solvent can be combined and shaken in a 0.5 liter sandmill with steel media for 8 hours. The resulting dispersion can be readily applied to a polymeric backing, e.g., polyethylene terephthalate, using a knife coating method.

In some applications, e.g., back-coat applications, magnetic particles need not be used in the binder composition.

The dispersion can be readily cured with a multifunctional isocyanate curing agent, e.g., a triisocyanate cross-linker. After a dispersion containing pigment, solvent, and binders is prepared, a curative is added. A typical curative comprises, for example, a triisocyanate such as the 3:1 adduct of toluene diisocyanate with trimethylol propane. One such material is available under the trade designation Mondur ™ CB-75 from Mobay Company. The curative is preferably added in a proportion of about 1-20% based on binder weight. After the dispersion is coated and dried, a cure takes place either at room temperature or at elevated temperatures (50°-60° C.).

A variety of adjuvants can be incorporated into the dispersions useful in the present invention. These include head-cleaning agents and lubricants. Wetting agents and dispersants, although usable, can generally be avoided in the binder of this invention.

If the binder described herein is used as a back-coat for magnetic media, the back-coat can include non-magnetizable pigments, such as, for example, carbon black, graphite, aluminum oxide, titanium dioxide, zinc oxide, silica gel, calcium carbonate, and barium sulfate.

The binder described herein can be used to prepare magnetic media such as tapes, e.g., video tapes, computer tape and data cartridge tape, and diskettes, both single-sided and double-sided.

The following examples illustrate the improvement provided by the binder composition of the present invention with respect to (a) viscosity of the dispersion containing the magnetic particles and (b) squareness ratio of the coating.

Five polymeric materials were used to evaluate the binder composition of the present invention:

Binder A: Sulfonated Hydroxy Epoxy-functional Vinyl Chloride Copolymer MR-120: manufactured by Nippon Zeon Co., Ltd.
  Sulfonate equivalent weight: 19,000 grams/gram mole
  Hydroxyl equivalent weight: 1,900 grams/gram mole
  Epoxy equivalent weight: 5,400 grams/gram mole Binder B: Sulfonated Hydroxy Epoxy-functional Vinyl Chloride Copolymer MR-110: manufactured by Nippon Zeon Co., Ltd.
  Sulfonate equivalent weight: 16,000 grams/gram mole
  Hydroxyl equivalent weight: 4,250 grams/gram mole
  Epoxy equivalent weight: 1,400 grams/gram mole Binder C: Carboxy Hydroxy-functional Vinyl Chloride Copolymer
  UCARMAG Binder 528: manufactured by Union Carbide Corporation
  Carboxyl equivalent weight: 5,600 grams/gram mole
  Hydroxyl equivalent weight: 850 grams/gram mole Binder D: Hydroxy-functional Vinyl Chloride Copolymer
  VAGH: manufactured by Union Carbide Corporation
  Hydroxyl equivalent weight: 740 grams/gram mole Binder E: Sulfonated hydroxy-functional polyurethane
  Sulfonate equivalent weight: 12,000 grams/gram mole
  Hydroxyl equivalent weight 1,700 grams/gram mole Preparation of Binder E "Tone" 0210 (67.77 kg) (164 equivalents), toluene (8.16 kg), and DMSSIP (5.72 kg) (39 equivalents) were combined and then heated to 80° C. with distillation of toluene. The remainder of toluene was removed under vacuum at 110° C. The vacuum was released under nitrogen and 40 g of tetrabutyltitanate was added. The system was then heated to 200° C. under nitrogen and held for 3 hours while collecting methanol distillate. After cooling to 120° C., a vacuum was pulled on the reaction mixture and these conditions were held for 4 hours. The sulfonated diol product was filtered and cooled. The hydroxyl equivalent weight of the sulfonated diol was 603 grams. The sulfonate equivalent weight was 3745 grams.

Methyl ethyl ketone (74.84 kg), cyclohexanone (18.14 kg), neopentyl glycol (3.97 kg) (76.2 equivalents), and the above-described sulfonated diol (15.88 kg) (29.1 equivalents), were combined, and methyl ethyl ketone (9.1 kg) was distilled off. Diphenylmethane diisocyanate (17.15 kg) (137.2 equivalents) and dibutyltin dilaurate (23 g) were added. The reaction was held at 35° C. for 3 hours, whereupon this prepolymer solution was drained to a clean dry holding container. It showed an isocyanate equivalent weight of 1,450 grams/equivalent. Methyl ethyl ketone (22.68 kg) and "Tone" 0305 (12.02 kg) (66.8 equivalents) were combined in the reaction vessel whereupon the prepolymer solution was added to this reaction mixture with stirring. After the isocyanate had reacted, a further addition of diphenylmethane diisocyanate (1.2 kg) gave a final inherent viscosity in tetrahydrofuran of 0.30. The product had a hydroxy equivalent weight of 1,700 grams/equivalent and a sulfonate equivalent weight of 12,000 grams/equivalent.

Commercially available materials used to prepare Binder E are the following:

"Tone" 0305 a polycaprolactone triol manufactured by Union Carbide, molecular weight about 540, hydroxyl equivalent weight about 180.

"Tone" 0210: a polycaprolactone diol manufactured by Union Carbide, molecular weight about 825, hydroxyl equivalent weight about 415.

DMSSIP: dimethyl sodium sulfoisophthalate, an aromatic sodium sulfonate salt, molecular weight 296.

EXAMPLE 1

A magnetic tape of this invention was prepared from the following ingredients in the amounts indicated:

| Ingredient | Parts by weight |
| --- | --- |
| Co-$\gamma$-Fe$_2$O$_3$ (specific surface area: 50 m$^2$/g) | 100 |
| Binder E | 17.5 |
| Binder A | 7.5 |
| Methyl ethyl ketone | 186 |
| Toluene | 0 |
| Cyclohexanone | 46 |

The composition described above was introduced into a 0.5 liter sandmill and mixed and dispersed therein, with steel media, for 8 hours. The resulting dispersion was applied to a film of a polyethylene terephthalate (thickness: 25 $\mu$m) by means of knife coating and the resulting coated film was allowed to stand in a parallel magnetic field of 1400 Oersted for about one second. The magnetic layer obtained had a thickness of about 5 $\mu$m.

EXAMPLE 2

A magnetic tape of this invention was prepared according to the procedure set forth in Example 1 from the following ingredients in the amounts indicated:

| Ingredient | Parts by weight |
| --- | --- |
| Co-$\gamma$-Fe$_2$O$_3$ (specific surface area: 50 m$^2$/g) | 100 |
| Binder E | 12.5 |
| Binder A | 12.5 |
| Methyl ethyl ketone | 186 |
| Toluene | 0 |
| Cyclohexanone | 46 |

EXAMPLE 3

A magnetic tape of this invention was prepared according to the procedure set forth in Example 1 from the following ingredients in the amounts indicated:

| Ingredient | Parts by weight |
| --- | --- |
| Co-$\gamma$-Fe$_2$O$_3$ (specific surface area: 50 m$^2$/g) | 100 |
| Binder E | 17.5 |
| Binder B | 7.5 |
| Methyl ethyl ketone | 175 |
| Toluene | 58 |
| Cyclohexanone | 58 |

EXAMPLE 4

A magnetic tape of this invention was prepared according to the procedure set forth in Example 1 from the following ingredients in the amounts indicated:

| Ingredient | Parts by weight |
| --- | --- |
| Co-$\gamma$-Fe$_2$O$_3$ (specific surface area: 50 m$^2$/g) | 100 |
| Binder E | 12.5 |
| Binder B | 12.5 |
| Methyl ethyl ketone | 175 |
| Toluene | 58 |
| Cyclohexanone | 58 |

COMPARATIVE EXAMPLE A

A magnetic tape similar to that of Example 1 was prepared according to the procedure set forth in Example 1 from the following ingredients in the amounts indicated. The only exception was that Binder C was used instead of Binder A. Binder C, unlike Binder A, did not contain sulfonate functionality.

| Ingredient | Parts by weight |
| --- | --- |
| Co-$\gamma$-Fe$_2$O$_3$ (specific surface area: 50 m$^2$/g) | 100 |
| Binder E | 17.5 |
| Binder C | 7.5 |
| Methyl ethyl ketone | 175 |
| Toluene | 58 |
| Cyclohexanone | 58 |

COMPARATIVE EXAMPLE B

A magnetic tape similar to that of Example 2 was prepared according to the procedure set forth in Example 2 from the following ingredients in the amounts indicated. The only exception was that Binder C was used instead of Binder A. Binder C, unlike Binder A, did not contain sulfonate functionality.

| Ingredient | Parts by weight |
| --- | --- |
| Co-$\gamma$-Fe$_2$O$_3$ (specific surface area: 50 m$^2$/g) | 100 |
| Binder E | 12.5 |
| Binder C | 12.5 |
| Methyl ethyl ketone | 175 |
| Toluene | 58 |
| Cyclohexanone | 58 |

COMPARATIVE EXAMPLE C

A magnetic tape similar to that of Example 3 was prepared according to the procedure set forth in Example 3 from the following ingredients in the amounts indicated. The only exception was that Binder D was used instead of Binder B. Binder D, unlike Binder B, did not contain sulfonate functionality.

| Ingredient | Parts by weight |
| --- | --- |
| Co-$\gamma$-Fe$_2$O$_3$ (specific surface area: 50 m$^2$/g) | 100 |
| Binder E | 17.5 |
| Binder D | 7.5 |
| Methyl ethyl ketone | 175 |
| Toluene | 58 |
| Cyclohexanone | 58 |

The dispersions for preparing the tapes of the foregoing examples were evaluated for viscosity. The squareness ratio of the magnetic coatings of the tapes prepared in the foregoing examples were also measured The results are set forth in Table 1:

TABLE 1

| Example number | Polar group of vinyl chloride copolymer | Viscosity of magnetic dispersion[1] (cps) | Squareness ratio of magnetic coating[2] |
|---|---|---|---|
| 1 | —SO$_3$Na | 4530 | 0.80 |
| 2 | —SO$_3$Na | 6380 | 0.77 |
| 3 | —SO$_3$Na | 1860 | 0.80 |
| 4 | —SO$_3$Na | 2320 | 0.80 |
| Comparative A | —COOH | 24000 | 0.72 |
| Comparative B | —COOH | 27000 | 0.70 |
| Comparative C | N/A | 35600 | 0.66 |

[1]Dispersion viscosity, in centipoise, is a measure of the ease of flow of a dispersion. The magnetic dispersion viscosity was measured on a Brookfield viscometer model LVTD (Brookfield Engineering Laboratories, Inc.) using spindle LV-3.
In general, magnetic dispersions of relatively high dispersion viscosity have been ineffective or inefficient for obtaining high quality magnetic recording media under certain circumstances, for example, low level of solvent, high particle loading, or high squareness ratio.
[2]Squareness ratio (Br/Bm) is the ratio of a residual magnetization (Br) to a saturation magnetization (Bm). For randomly-oriented particles, the squareness ratio is 0.5 and for ideally and perfectly oriented particles, the ratio is equal to 1.0.

The data in Table 1 show that the presence of —SO$_3$Na moieties in the vinyl chloride copolymer reduces the viscosity of the magnetic dispersion and increases the squareness ratio of the magnetic coating resulting from the dispersion.

EXAMPLES 5-6

The following examples illustrate how the presence of vinyl chloride copolymer in the binder of this invention improves the physical characteristics of a magnetic recording medium formed therefrom.

The following formulations were used to prepare the binders of Comparative Example D and Examples 5 and 6.

| Ingredient | Amount (parts by weight) | | |
|---|---|---|---|
| | Comparative Example D | Example 5 | Example 6 |
| Co-γ-Fe$_2$O$_3$ (specific surface area: 50 m$^2$/g) | 100 | 100 | 100 |
| Aluminum oxide | 7 | 7 | 7 |
| Binder E | 25 | 17.5 | 12.5 |
| Binder A | 0 | 7.5 | 12.5 |
| Tetrahydrofuran | 235 | 235 | 235 |
| Polyisocyanate compound ("Mondur" CB-601, Mobay Company) | 7 | 7 | 7 |
| Myristic acid | 2.5 | 2.5 | 2.5 |
| Butyl stearate | 1 | 1 | 1 |

The Co-γ-Fe$_2$O$_3$, aluminum oxide, Binder E, and Binder A were introduced into the tetrahydrofuran in a 55 gallon drum, and the resulting mixture was dispersed in a 22 liter horizontal sandmill with glass media for about 14 hours.

The resulting dispersion was filtered through a "Nippon Roki HT-40" filter. The polyisocyanate compound, myristic acid, and butyl stearate were added to the filtered dispersion. The resulting dispersion was applied to one major surface (front side) of a polyethylene terephthalate film (thickness: 11 μm) by means of gravure coating. The other major surface of the polyethylene terephthalate film (back side) had a back-coat comprising carbon black, aluminum oxide, and binders, which back-coat had been coated on the polyethylene terephthalate film by means of gravure coating before the magnetizable dispersion had been coated on the front side. The back-coat had been prepared in the following manner. Carbon black (100 parts by weight, particle size of 42 nm, specific surface area of 80 m$^2$/g), aluminum oxide (9 parts by weight), a dispersant (5 parts by weight, a phosphorylated polyol/quaternary ammonium salt mixture), phenoxy resin (58 parts by weight, PKHH, Union Carbide Co.), and polyurethane (88 parts by weight, "Estane" 5705, B.F. Goodrich Co.) were dispersed in tetrahydrofuran (1473 parts by weight) in a 22 liter horizontal sandmill by means of glass media. Polyisocyanate (34 parts by weight, "Mondur" CB-601) was added to the dispersion prior to coating. The back-coat had a root mean square roughness of about 350 nm. The resulting coated film was allowed to stand in a parallel magnetic field of 3000 gauss for 0.1 second and then dried through a dryer at a temperature of 60°-80° C. The resulting dried coating was calendered with a metal roll, and the magnetic layer obtained had a thickness of about 2.5 μm. The resulting calendered coating was wound (total coating length amounted to 1000 m) and slit to a tape width of 6.35 mm.

The physical properties of the thus-formed tapes are set forth in Table 2.

TABLE 2

| Example number | Viscosity of magnetic dispersion (cps) | Squareness ratio of magnetic coating | Tg[1] (°C.) | Surface roughness[2] (μm) | Output[3] (dB) | Cure[4] (%) |
|---|---|---|---|---|---|---|
| Comparative D | 3060 | .85 | 40 | 18 | −1 | 97 |
| 5 | 2700 | .84 | 60 | 10 | 0 | 96 |
| 6 | 2200 | .84 | 70 | 10 | 0 | 95 |

[1]Glass transition temperature (Tg) means a temperature of peak tan delta measured by an autovibron, in the uncured state.
[2]Root mean square roughness of the surface of the front-coat was measured by microscopic interferometry.
[3]Output was measured by a data cartridge drive with 50,000 flux changes per inch at a tape speed of 120 inches per second.
[4]Cure means the ratio of amount of binder unextracted in tetrahydrofuran in the cured state to amount of binder extracted in tetrahydrofuran in the uncured state as measured by gel permeation chromatography (GPC). Samples were cured by heating at 60° C. for 3 days prior to extraction.

The data in Table 2 show that the presence of —SO$_3$Na moieties in the vinyl chlordie copolymer increases the glass transition temperature in the uncured state, reduces the surface roughness of the front-coat, and increases the output.

Various modifications and alterations of this invention will become apparent to those skilled in the art without departing from the scope and spirit of this invention, and it should be understood that this invention is not to be unduly limited to the illustrative embodiments set forth herein.

What is claimed is:
1. A composite for magnetic recording; comprising:
   (a) a substrate having a front side and a backside;
   (b) a first cured coatign on the front side of the substrate, wherein said first cured coating is obtained from reactants comprising:
      (i) from about 10 to about 90 parts by weight of a curable, sulfonated, hydroxy-functional polyurethane poloymer, which comprises a first plurality of SO$_3$M groups pendant from the polyurethane polymer backbone, wherein the polyurethane polymer has an SO$_3$M equivalent weight of from about 2,000 to about 100,000, and wherein M is selected from the group consisting of $H^+$, $Li^+$, $Na^+$, $K^+$, $NR_4^+$ where R can be $H^{++}$ or an alkyl group, and mixtures thereof; and a first plurality of cross-linkable hydroxyl groups wherein the polyurethane polymer has a hydroxyl equivalent weight of from about 500 to about 10,000, and wherein at least a majority of the hydroxyl groups are pendant from the polyurethane polymer backbone at locally hydrophobic sites; and (ii) from about 10 to about 90 parts by weight of a curable, sulfonated, hydroxy-functional vinyl chloride copolymer, which comprises a second plurality of $SO_3M$ groups pendant from the vinyl chloride copolymer backbone, wherein the vinyl chloride copolymer has an $SO_3M$ equivalent weight of from about 2,000 to about 100,000, and wherein M is selected from the group consisting of $H^+$, $Li^+$, $Na^+$, $K^+$, $NR_4^+$ where R can be $H^+$ or an alkyl group, and mixtures thereof; and a second plurality of cross-linkable hydroxyl groups wherein the vinyl chloride copolymer has a hydroxyl equivalent weight of from about 500 to about 10,000; and (c) a magnetizable pigment dispersed in said first cured coating;

wherein said polyurethane polymer is obtained by reacting a sulfonated polyisocyanate prepolymer having at least two reactive isocyanate groups and having substantially no hydroxy functionality with a hydrophobic polyol having at least three reactive hydroxy grups, wherein said hydrophobic polyol is present in a sufficient amount such that there is at least about a 67% excess of reactive hydroxy groups relative to reactive isocyanate groups.

2. The composite according to claim 1, wherein M for the first plurality of $SO_3M$ groups is selected from the group consisting of $H^+$, $Li^+$, $Na^+$, $K^+$, and mixtures thereof, and wh4rein M for the second plurality of $SO_3M$ groups is selected from the group consisting of $H^+$, $Li^+$, $Na^+$, $K^+$, and mixtures therefo.

3. The composite according to claim 2, wherein M for the first plurality of $Li^+$, $Na^+$, $K^+$, and mixtures thereof, and wherein M for the second plurality of $SO_3M$ groups is selected from the group consisting of $Li^+$, $Na^+$, $K^+$, and mixtures thereof.

4. The composite according to claim 2, wherein the magnetizable pigment is oriented to a squareness ratio of at least about 0.75.

5. The composite according to claim 2, wherein the magnetizable pigment is oriented to a squareness ratio of at least about 0.80.

6. The composite according to claim 2, wherein the first plurality of $SO_3M$ groups are aromatic $SO_3M$ groups.

7. The composite according to claim 2, wherein the first plurality of $SO_3M$ groups are aliphatic $SO_3M$ groups.

8. The composite according to claim 2, wherein:
(a) the $SO_3M$ equivalent weight of the polyurethane polymer is from about 5,000 to about 30,000; and
(b) the hydroxyl equivalent weight of the polyurethane polymer is from about 1,000 to about 5,000.

9. The composite according to claim 2, wherein:
the $SO_3M$ equivalent weight of the vinyl chloride copolymer is from about 5,000 to about 30,000.

10. The composite according to claim 2, further comprising a plurality of epoxy groups pendant from the vinyl chloride copolymer backbone, wherein the vinyl chloride copolymer has an epoxy equivalent weight of from about 500 to about 30,000.

11. The composite according to claim 2, wherein the epoxy equivalent weight is from about 1,000 to about 10,000.

12. The composite according to claim 2, further comprising a second cured coating on the back side of the substrate, wherein said second cured coating is obtained from reactants comprising:

(a) from about 10 to about 90 parts by weight of a curable, sulfonated, hydroxy-functional polyurethane polymer, which comprises a first plurality of $SO_3M$ groups pendant from the polyurethane polymer backbone, wherein the polyurethane polymer has an $SO_3M$ equivalent weight of from about 2,000 to about 100,000, and wherein M is selected from the group consisting of $H^+$, $Li^+$, $Na^+$, $K^+$, $NR_4^+$ where R can be $H^+$, or an alkyl group, and mixtures thereof; and a first plurality of cross-linkable hydroxyl groups wherein the polyurethane polymer has a hydroxyl equivalent weight of from about 500 to about 10,000, and wherein at least a majority of the hydroxy groups are pendant from the polyurethane polymer backbone at locally hydrophobic sites; said polyurethane polymer being obtained by reacting a sulfonated polyisocyanate prepolymer having at least two reactive isocyanate groups and having substantially no hydroxy functionality with a hydrophobic polyol having at least three reactive hydroxy groups, wherein said hydrophobic polyol is present in a sufficient amount such that there is at least about a 67% excess of reactive hydroxy groups relative to reactive isocyanate groups, and (b) from about 10 to about 90 parts by weight of a curable, sulfonated, hydroxy-functional vinyl chloride copolymer, which comprises a second plurality of $SO_3M$ groups pendant from the vinyl chloride copolymer backbone, wherein the vinyl chloride copolymer has an $SO_3M$ equivalent weight of from about 2,000 to about 100,000, and wherein M is selected from the group consisting of $H^+$, $Li^+$, $Na^+$, $K^+$, $NR_4^+$ where R can be $H^+$, or an alkyl group, and mixtures thereof; and a second plurality of cross-linkable hydroxyl groups wherein the vinyl chloride copolymer has a hydroxyl equivalent weight of from about 500 to about 10,000.

13. The composite according to claim 12, further comprising pigment dispersed in said second cured coating.

14. The composite according to claim 1, wherein the sulfonated polyisocyanate prepolymer is obtained from reactants comprising:
(a) a sulfonated diol;
(b) optionally, a non-sulfonated polyol; and
(c) a polyisocyanate, wherein said polyisocyanate is present in a sufficient amount such that there is at least about a 30% excess of reactive isocyanate groups from the polyisocyanate relative to reactive hydroxy groups from the sulfonated diol and the optional non-sulfonated polyol.

15. The composite according to claim 1, wherein the hydrophobic polyol is a triol having a molecular weight of from 200 to 1000.

* * * * *

UNITED STATES PATENT AND TRADEMARK OFFICE
CERTIFICATE OF CORRECTION

PATENT NO. : 5,085,941

DATED : February 4, 1992

INVENTOR(S) : Ohkubo

It is certified that error appears in the above-identified patent and that said Letters Patent is hereby corrected as shown below:

Col. 3, line 47, "polymer 10 backbone" should be --polymer backbone--.

Col. 4, line 48, "modulus As" should be -- modulus. As--.

Col. 4, line 54, "humidity In" should be --humidity. In--.

Col. 4, line 61, "INvENTION" should be --INVENTION--.

Col. 4, line 67, "assignee s" should be --assignee's--.

Col. 4, line 68, "Ser. No. 29,720" should be --Ser. No. 429,720--.

Col. 5, line 1, "assignee,s" should be --assignee's--.

Col. 5, line 21, "solvents Preferred" should be --solvents. Preferred--.

Col. 5, line 47, "wei9ht" should be --weight--.

Col. 5, line 57, "NRhd 4+" should be --$NR_4^+$--.

UNITED STATES PATENT AND TRADEMARK OFFICE
CERTIFICATE OF CORRECTION

PATENT NO. : 5,085,941
DATED : February 4, 1992
INVENTOR(S) : Ohkubo

It is certified that error appears in the above-identified patent and that said Letters Patent is hereby corrected as shown below:

Col. 6, line 16, "environments However," should be --environments. However,--.

Col. 7, line 17, "pi9ment" should be --pigment--.

Col. 9, line 35, "se9ment" should be --segment--.

Col. 11, line 35, "polymes" should be --polymers--.

Col. 11, line 35, "may too" should be --may be too--.

Col. 13, line 32, "Fe2O3)" should be --$Fe_2O_3$)--.

Col. 17, line 2, "measured The" should be --measured. The--.

Col. 18, line 58, "coatign" should be --coating--.

Col. 19, line 2, "H++or" should be --$H^+$ or--.

Col. 19, line 31, "grups" should be --groups--.

Col. 19, line 38, "wh4rein" should be --wherein--.

Col. 19, line 40, "therefo" should be --thereof--.

Col. 19, line 42, "of Li+," should be --of $SO_3M$ groups is selected from the group consisting of Li+,--.

UNITED STATES PATENT AND TRADEMARK OFFICE
CERTIFICATE OF CORRECTION

PATENT NO. : 5,085,941

DATED : February 4, 1992

INVENTOR(S) : Takatoshi Ohkubo

It is certified that error appears in the above-identified patent and that said Letters Patent is hereby corrected as shown below:

Column 20, line 25, "hydroxy" should read --hydroxyl--.

Signed and Sealed this

Sixth Day of July, 1993

Attest:

MICHAEL K. KIRK

Attesting Officer

Acting Commissioner of Patents and Trademarks